United States Patent
Sinclair et al.

(10) Patent No.: US 10,775,891 B2
(45) Date of Patent: Sep. 15, 2020

(54) RESISTANCE-BASED HAPTIC DEVICE

(71) Applicant: Microsoft Technology Licensing, LLC, Redmond, WA (US)

(72) Inventors: Michael Jack Sinclair, Kirkland, WA (US); Eyal Ofek, Redmond, WA (US); Christian Holz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 15/943,610

(22) Filed: Apr. 2, 2018

(65) Prior Publication Data

US 2019/0302887 A1 Oct. 3, 2019

(51) Int. Cl.
- *G06F 3/01* (2006.01)
- *G06F 3/0487* (2013.01)
- *G05G 5/03* (2008.04)

(52) U.S. Cl.
CPC ............. *G06F 3/016* (2013.01); *G05G 5/03* (2013.01); *G06F 3/014* (2013.01); *G06F 3/0487* (2013.01)

(58) Field of Classification Search
CPC ......... G06F 3/016; G06F 3/0487; G06F 3/014
See application file for complete search history.

(56) References Cited

U.S. PATENT DOCUMENTS

| | | | |
|---|---|---|---|
| 6,020,875 A | 2/2000 | Moore et al. | |
| 6,036,495 A | 3/2000 | Marcus et al. | |
| 6,946,812 B1 | 9/2005 | Martin et al. | |
| 7,318,361 B2 | 1/2008 | Boutteville et al. | |
| 7,480,600 B2 | 1/2009 | Massie et al. | |
| 8,545,323 B2 | 10/2013 | McVicar et al. | |
| 2004/0145563 A9 | 7/2004 | Rosenberg et al. | |
| 2005/0024331 A1* | 2/2005 | Berkley | G06F 3/016 345/161 |
| 2013/0194083 A1 | 8/2013 | Rao | |
| 2015/0290814 A1 | 10/2015 | Schiele et al. | |

(Continued)

FOREIGN PATENT DOCUMENTS

| | | |
|---|---|---|
| EP | 1691254 A1 | 8/2006 |
| WO | 2006037017 A2 | 4/2006 |

OTHER PUBLICATIONS

Faulring, et al., "Haptic display of constrained dynamic systems via admittance displays", In Journal of IEEE Transactions on Robotics, vol. 23, Issue 1, Feb. 2007, pp. 1-11.

(Continued)

*Primary Examiner* — Muhammad N Edun
(74) *Attorney, Agent, or Firm* — Alleman Hall Creasman & Tuttle LLP

(57) ABSTRACT

A haptic device includes a drum configured to rotate about an axis, a cord wound around the drum, a user-actuatable lever operatively coupled to the drum and configured to receive a user-actuation force, a position sensor configured to determine a rotational position of the drum, and an actuator operatively coupled to the cord. The actuator may be configured to apply a tension to the cord that further applies friction to brake the drum to cause the user-actuatable lever to provide a user-perceived resistance that opposes the user-actuation force. The user-perceived resistance may vary as a function of the rotational position of the drum.

20 Claims, 5 Drawing Sheets

(56) References Cited

U.S. PATENT DOCUMENTS

2016/0224167 A1* 8/2016 Norieda .............. G06F 3/0414
2018/0319422 A1* 11/2018 Polmans .............. B62D 5/005

OTHER PUBLICATIONS

Gosselin, et al., "Development of a New Backdrivable Actuator for Haptic Interfaces and Collaborative Robots", In Journal of Actuators, vol. 5, No. 2, Jun. 9, 2016, pp. 1-26.

In, et al., "Capstan Brake: Passive Brake for Tendon-Driven Mechanism", In Proceedings of IEEE/RSJ International Conference on Intelligent Robots and Systems, Oct. 7, 2012, pp. 2301-2306.

"Capstan Equation", Retrieved from <<https://en.wikipedia.org/wiki/Capstan_equation>>, Dec. 6, 2017, 5 Pages.

"Stick-slip Phenomenon", Retrieved from <<https://en.wikipedia.org/wiki/Stick-slip_phenomenon>>, Feb. 28, 2018, 3 Pages.

"International Search Report and Written Opinion Issued in PCT Application No. PCT/US2019/023955", dated May 27, 2019, 14 Pages.

* cited by examiner

RESISTANCE-BASED HAPTIC DEVICE

BACKGROUND

Haptic devices may be used to enhance interaction with a virtual environment, such as a video game or virtual reality experience. In particular, haptic devices may be used to provide force feedback that represents virtual forces in the virtual environment. Such force feedback may enhance a perception of tangibility of the virtual environment that may make the virtual experience more immersive and realistic.

DETAILED DESCRIPTION

Figure 1:
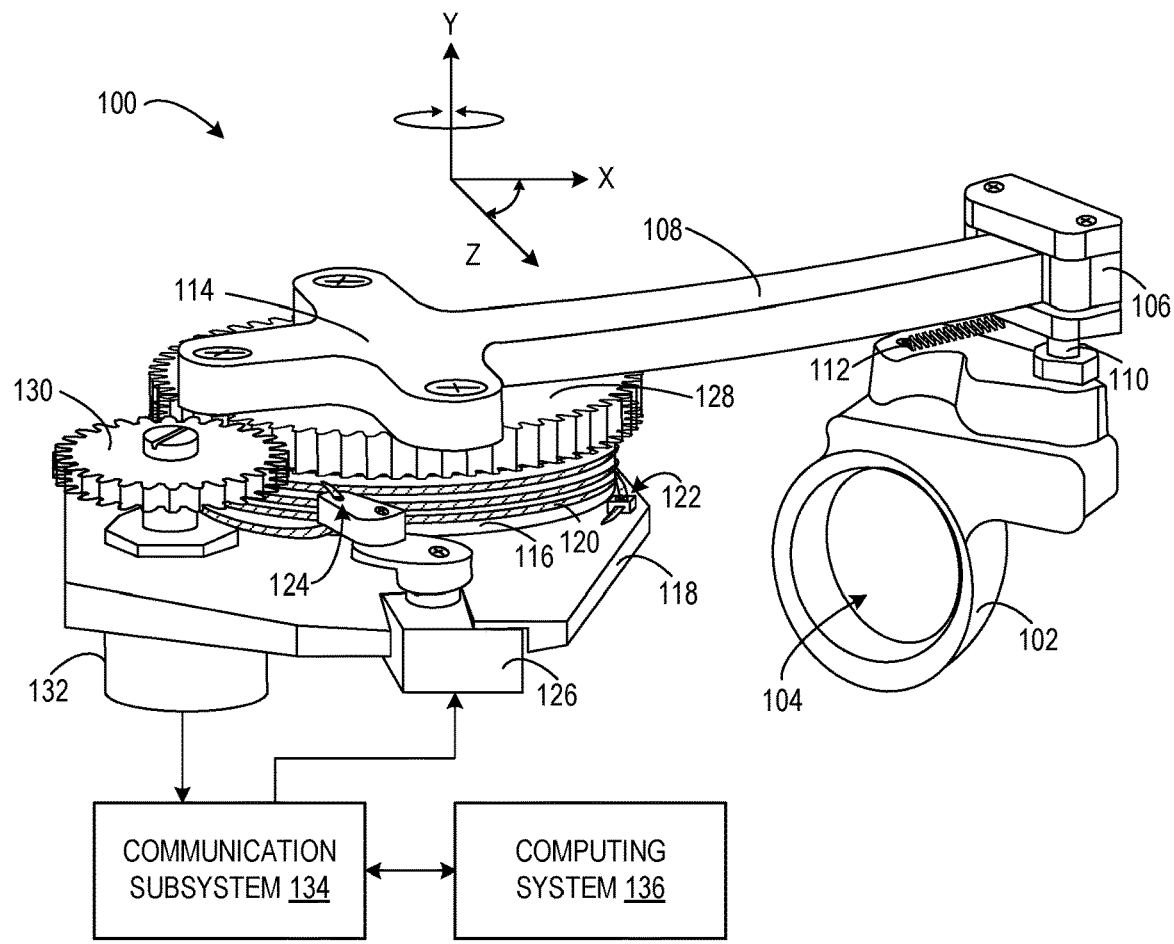
FIG. 1 schematically shows an example haptic device.

Many conventional haptic devices in use today are of the electro-vibration type that vibrate to provide haptic feedback to a user, e.g., in a gaming controller. However, vibration is not generally known for being a natural user input—it for example is unusual for a normal object to vibrate when it is handled. Another conventional type of haptic device in use today is of the electro-mechanical active type that actively applies forces directly to human limb(s) and actively produces a human-scale force or torque, for example via an electrical motor. This type of active haptic device is only capable of converting electrical energy directly into the applied force or torque. This type of active haptic device may require a relatively large amount of electrical power to create a large applied force of human scale. In many examples, an active haptic device may include a small electrical motor that is geared down to produce a large applied force. However, this geared-down motor configuration, though increasing the applied force that can be produced by the motor, may cause a variety of issues. As an example, such a configuration may result in a slower actuation speed of the actuator output. As another example, such a configuration may have large battery power requirements. As yet another example, such a configuration may be less robust, because the gearing may be stripped or otherwise compromised by a human-scale force.

Accordingly, the present description is directed to a haptic device that mechanically resists or constrains movement of a human subject by controlling a small internal, programmable force that exerts, via a mechanical advantage, a larger force to counteract an external user-provided input force. In one example, a haptic device includes a drum rotatable about an axis, a cord wound around the drum, a user-actuatable lever operatively coupled to the drum, a position sensor configured to determine a rotational position of the drum, and a small actuator operatively coupled to the cord. The actuator may apply a tension to the cord such that the cord squeezes the drum to provide a user-perceived resistance that opposes a user-actuation force applied to the lever. The user-perceived resistance may be varied by the actuator as a function of the rotational position of the drum.

This novel haptic device leverages the cord and drum arrangement by using relatively small forces from the actuator to variably tension the cord. The resulting drum-cord friction brakes rotation of the drum, such that relatively large human-applied forces to the lever can be countered to create large haptic forces. This, for example, can enable scenarios where virtual objects mimic the feel and behavior of real-world objects. The resulting haptic effect produced by the haptic device may be similar to that of a mechanical brake on a bicycle or car. By mechanically amplifying the output torque of the small actuator to provide the user-perceived resistance, the maximum output force capabilities of the actuator may be relatively small. Moreover, in this particular configuration, the actuator is only relied upon to provide output torque to resist the human-provided input force, and is not relied upon to actively move the user-actuatable lever (e.g., when no human input force is provided). As such, when compared to an active electro-mechanical haptic device powered by a motor having the same or similar size, weight, and torque capability, this novel haptic device is capable of resisting a larger force, consuming less electrical power, operating faster, and is more robust.

Furthermore, in this haptic device, the motor may be controlled to vary the tension applied to the cord such that the user-perceived resistance varies as a function of the rotational position of the drum. This allows for the haptic device to provide a variety of different types of resistive feedback that may be used to simulate touching or grasping various objects, such as a hard object, a soft object, or an object having visco-elastic properties, among other types of resistive feedback. Moreover, by varying the resistance as a function of the rotational position of the drum, the haptic device may be used to simulate various real-world objects that have variable resistances when pressed or grasped, such as buttons, keys, triggers, etc. Such variable resistive feedback provided by the haptic device may be particularly beneficial to simulate real world haptics for virtual objects in virtual reality/mixed reality/augmented reality scenarios.

FIG. 1 schematically shows an example haptic device 100 that is wearable by a user to provide resistive force feedback. The haptic device 100 is configured to interface with an index finger (also referred to as a pointer finger, first finger, trigger finger) on a user's right hand (not shown). The haptic device 100 may be coupled to the user's hand in any suitable manner. For example, the haptic device 100 may be coupled to the user's hand via a strap or band. In another example, the haptic device 100 may be incorporated into a glove worn on the user's hand.

The haptic device 100 includes a finger ring 102 that forms an aperture 104 through which a user's finger (not shown) may extend. The finger ring 102 is connected to a load end 106 of a lever 108. In particular, the finger ring 102 is connected to the lever 108 via a joint 110 that enables the finger ring 102 to rotate relative to the lever 108. An axis of rotation (Y-axis) of the joint 110 is perpendicular to a plane of actuation (X-Z plane) of the lever 108. Note that the X,Y, and Z axes are provided as a frame of reference that is meant to be non-limiting and these axes do not connote actual real-world directions. In some examples, the joint 110 may have a different angle of rotation relative to the plane of actuation of the lever 108. The finger ring 102 may rotate relative to the actuation lever 108 to accommodate different sized fingers and/or different styles of grips of different users.

A trigger bias spring 112 may be connected between the finger ring 102 and the load end 106 of the lever 108. The trigger bias spring 112 may be configured to bias the finger ring 102 towards a resting position at which a baseline resistance (based on the spring force) is applied to the user's finger when the user's finger is positioned in the finger ring 102 and not providing a user-actuation force. When a user-actuation force that is greater than the spring force of the trigger bias spring 112 is applied to the finger ring 102, the trigger bias spring 112 may expand and the lever 108 may actuate. As such, the lever 108 may be referred to herein as a user-actuatable lever.

An effort end 114 of the lever 108 that opposes the load end 106 is coupled to a drum 116 such that the lever 108 maintains a fixed position relative to a position of the drum 116. In the illustrated example, the effort end 114 of the lever 108 has a cross shape, and the lever 108 is coupled to the drum 116 via a plurality of mounting screws that are fed through each arm of the cross. The lever 108 may be fixed to the drum 116 in using any suitable coupling mechanism.

The drum 116 is rotatably mounted to a frame 118. The drum 116 is rotatable about the Y-axis. Since the lever 108 is fixed relative to the drum 116, when the drum 116 rotates about the Y-axis, the lever 108 actuates in the X-Z plane. The range of the rotation of the drum 116 is designed based on a range of movement of the index finger that interfaces with the finger ring 102. In one example, the range of rotation of the drum 116 is forty-five degrees. The drum 116 may be configured to have any suitable range of rotation.

A cord 120 is wrapped around the drum 116. A first end 122 of the cord 120 is fixed to the frame 118 and a second end 124 of the cord 120 is coupled to an actuator 126 that is fixed to the frame 118. By fixing the opposing end 122 of the cord 120 directly to the frame 118, tension applied by the actuator 126 to the cord 120 is transferred to the drum 116 instead of placing a load on the cord 120.

Note that the cord is provided as a non-limiting example. Any suitable material or flexible structure may be wound around the drum to exert variable frictional force on the drum when tightened. In alternative examples, a rope or cable may be wound around the drum.

The actuator 126 is operable to apply a tension to the cord 120 that further applies friction to brake the drum 116 to cause the lever 108 to provide a user-perceived resistance that opposes a user-actuation force applied to the finger ring 102. In particular, the tension applied by the actuator 126 causes the cord 120 to squeeze the drum 116 and causes the drum 116 to brake with a user-perceived resistance that opposes the user-actuation force. The drum 116 and cord 120 cooperate to create mechanical gain that enables the small internal tension output from the actuator 126 to be translated into a much larger resistance force that opposes the human input. In other words, this resistive actuator is used to resist a large external torque much in the same manner as a brake on a vehicle or a bicycle operates.

In the illustrated example, the actuator 126 includes a motor, gear train, and lever that are configured to apply tension to the cord. It will be appreciated that the actuator may take any suitable form such that it can apply a programmable mechanical tension to the cord. For example, the actuator may include a motor or solenoid, or twisted string actuator or voice coil actuator or any other electro-mechanical transducer (actuator) capable of exerting a linear force.

Figure 2:
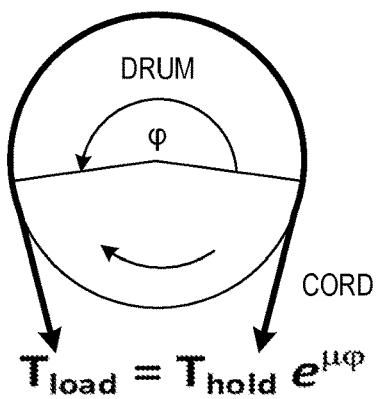
FIG. 2 show a relationship between a hold torque that is amplified by a cord wrapped around a drum of a haptic device to oppose a load torque.

The relationship of the drum 116 and the cord 120 that enables the mechanical advantage is characterized by an equation that is illustrated in FIG. 2. Specifically, $T_{load}$ is the applied cord tension, $T_{hold}$ is the minimum cord tension required to keep the cord from slipping on the drum, $\mu$ is the friction coefficient between the cord and the drum, and $\varphi$ is the total angle swept by all turns of the cord wound around the drum. Note that $T_{load}$ is always larger than $T_{hold}$ which indicates the mechanical gain or torque amplification. According to the illustrated equation, a large external input torque or user-actuation force $T_{load}$ can be resisted with a small internal, programmable force $T_{hold}$.

Furthermore, the friction coefficient ($\mu$) between the cord 120 and the drum 116 materials may be chosen to allow a smooth transition from static friction (cord not slipping) to dynamic friction (cord slipping) or simply put, to minimize the stick-slip disparity. It will be appreciated that the drum 116 and cord 120 may be made of any suitable materials to achieve a desired friction coefficient ($\mu$) that provides predictive and consistent resistive behavior. In one particular example, the drum 116 is made of acrylonitrile butadiene styrene (ABS) and the cord is made of Vectran in order to achieve the desired friction coefficient. Moreover, Vectran provides the benefits of not stretching or creeping (i.e., elongating over time).

Returning to FIG. 1, in the illustrated example, the cord 120 is wrapped three times around the drum 116 according to the total angel ($\varphi$) in the equation depicted in FIG. 2. It will be appreciated that the cord 120 may be any suitable length and may be wrapped around the drum 116 any suitable number of times to achieve the desired frictional coefficient ($\mu$) in order for the haptic device 100 to provide human-scale resistive force feedback.

Furthermore, in this implementation, the haptic device 100 is configured to be unidirectional such that the haptic device 100 only provides mechanical resistance in one direction to oppose a user-actuation force and is mostly free to rotate in the other direction. The benefit here is to be able to automatically apply a resistive force to the finger closing and no force to the finger opening. In other words, the actuator 126 is used in a passive manner and is not used to actively move the lever 108 to an extended position (e.g., when the user is not applying an actuation force). Such a configuration allows for the actuator 126 to be light, small, power efficient, and inexpensive. For example, the actuator 126 may have a twenty-to-one gear ratio or greater with a ten-millisecond or less response time. Such a motor speed may enable the haptic device 100 to accurately respond to a user-actuation force without any perceivable lag. The actuator 126 may be back-drivable. This may enable the direction of the actuator 126 to be reversed in order to reduce tension on the cord 120 and/or between gears 128 and 130 such that the actuator 126 can spin freely, for example. A twisted string actuator, solenoid or voice coil actuator may also be used as a back-drivable actuator.

In some implementations, the output torque of the actuator 126 may be proportional to the electrical current used to control the actuator 126. For example, the actuator 126 may have a one-to-one force-to-current ratio. By designing the actuator in this manner, the output force of the actuator 126 can be determined in an open loop fashion without the need for force feedback. In other implementations, the output torque of the actuator 126 may not be proportional to the electrical current used to control the actuator 126. In some such implementations, the haptic device 100 may include a force transducer configured to provide force feedback that may be used to control the actuator 126.

The primary gear 128 is positioned intermediate the lever 108 and the drum 116. The primary gear 128 meshes with the intermediate gear 130. The intermediate gear 130 is connected to an analog encoder 132 via a shaft that extends through the frame 118. The analog encoder 132 is mounted to an underside of the frame 118. The analog encoder 132 is configured to convert the angular position of the drum 116 into a digital signal. The primary and intermediate gears 128 and 132 mate the analog encoder 132 to the drum 116 to enable the analog encoder 132 to provide position feedback. The analog encoder 132 is provided as an example of a position sensor that determines the angular position of the drum 116. In other examples, a Hall Effect sensor, an optical sensor, or another type of position sensor may be employed. Any suitable type of position sensor may be used to determine the angular position of the drum 116. In another example, the position of the drum may be tracked by an external optical sensor that is separate from the haptic device. For example, markers (e.g., LEDs) may be positioned on the drum or lever arm, and the position of the markers may be optically tracked by external cameras (e.g., surrounding cameras or a camera in a headset) operatively coupled to a computing system in communication with the haptic device.

The haptic device 100 includes a communication subsystem 134 configured to communicatively couple the haptic device 100 with a computing system 136. The communication subsystem 134 may include a wired or wireless connection with the computing system 136. The communication subsystem 134 may include any suitable communication hardware to enable communication according to any suitable communication protocol (e.g., Wi-Fi, Bluetooth). For example, such communicative coupling may enable two-way communication between the haptic device 100 and the computing system 136.

The communication subsystem 134 is configured to receive the rotational position of the drum 116 from the analog encoder 132 and send the rotational position of the drum 116 to the computing system 136. Further, the communication subsystem 134 is configured to receive a control signal from the computing system 136 and send the control signal to the actuator 126. The actuator 126 is configured to apply a tension to the cord 120 based on the control signal. In one example, the control signal is an electrical current that is used to drive the actuator 126.

The computing system 136 may determine the control signal based on a variety of factors. Furthermore, the computing system 136 may vary the control signal as a function of the rotational position of the drum 116. Moreover, the rotational position of the drum may be used to derive additional parameters that may be used as input to the function. For example, the rotational position may be used to derive a change in position, a speed, a force, an acceleration, a direction, among other parameters. Such a function may be defined in any suitable manner. In one example, the function is a constant or time-variant function of one or more inputs. In one example, the function is a set of points from which the output is linearly interpolated based on the input. In another example, the function is a set of value/range pairs from which the value is selected when the input is in the corresponding range. By varying the control signal in this manner, the haptic device 100 may provide a gradient of resistance ranging from little or no perceivable resistance to a full lock of the drum 116 to create a hard stop of the lever 108 at a designated rotational position in the rotation range of the drum 116.

In some examples, the computing system 136 may determine the control signal based on at least the rotational position of the drum 116. For example, a change in rotational position of the drum 116 may indicate an amount of user-actuation force that is being applied to the finger ring 102, and the computing system 136 may determine a control signal that produces a suitable user-perceived resistance to the user-actuation force.

In some examples, the computing system 136 may determine the control signal based on at least some other form of sensor feedback. As an example, the haptic device 100 may include a force transducer or sensor, and the control signal may be determined based on the indication of force. In one example, the force sensor is located on the finger ring to detect force applied by a user's finger pad. In other examples, the force sensor may be located on the lever arm, the frame, or both.

In some examples, the computing system 136 may determine the control signal based on at least a state of the computing system 136. For example, the computing system 136 may determine the control signal based on a state of a video game or other application being executed on the computing system 136. In one example where the computing system 136 executes a video game in which a virtual object is displayed in a virtual environment, the computing system 136 may determine the control signal to provide a user-perceived resistance that corresponds to the virtual object's texture (e.g., hard, soft, squishy).

In some examples, the computing system 136 may determine the control signal based on at least an identity or user profile of a user that is interacting with the haptic device 100. For example, the control signal may be determined to provide a user-perceived resistance that is customized for a specific user. As an example, the user-perceived resistance may simulate virtual buttons of a virtual keyboard, and the user-perceived resistance may be customized to simulate a particular button force or travel distance of the keys. In another example, the user-perceived resistance may simulate the trigger of a virtual gun, and the user-perceived resistance may be customized to simulate a particular pull weight or travel distance of the trigger.

In some implementations, the computing system 136 may take the form of an external computing system, such as a game console, virtual-reality/mixed-reality/augmented-reality device (e.g., HMD), desktop computer, laptop computer, or smartphone. In such implementations, the haptic device 100 may act as peripheral device that communicates with the external computing system. In other implementations, the computing system 136 may take the form of an on-board computing system, such as a microcomputer, or microcontroller that is incorporated into the haptic device 100. In one example, the computing system 136 is a microprocessor that is mounted to the frame 118 of the haptic device 100.

It will be appreciated that the computing system 136 may determine the control signal in any suitable manner to control the haptic device 100 in order to resist or constrain any suitable human movement. Although the illustrated haptic device is configured to interface with a user's right-hand index finger, the haptic device may be configured to interface with any suitable finger. In some implementations, the haptic device may be configured to interface with, or provide resistance to, two or more fingers individually or in conjunction, and in some cases, all fingers on a user's hand individually or in conjunction. In some implementations, the haptic device may provide resistance or constrain movement of other parts of a user's body besides a finger. In some examples, the haptic device may be configured to resist or constrain movements of different joints, such as a wrist, elbow, shoulder, neck, hip, knee, ankle, or toe. In some implementations, features of the haptic device may be incorporated into a user input device for a computing system, such as a game controller for a game console.

Figure 3:
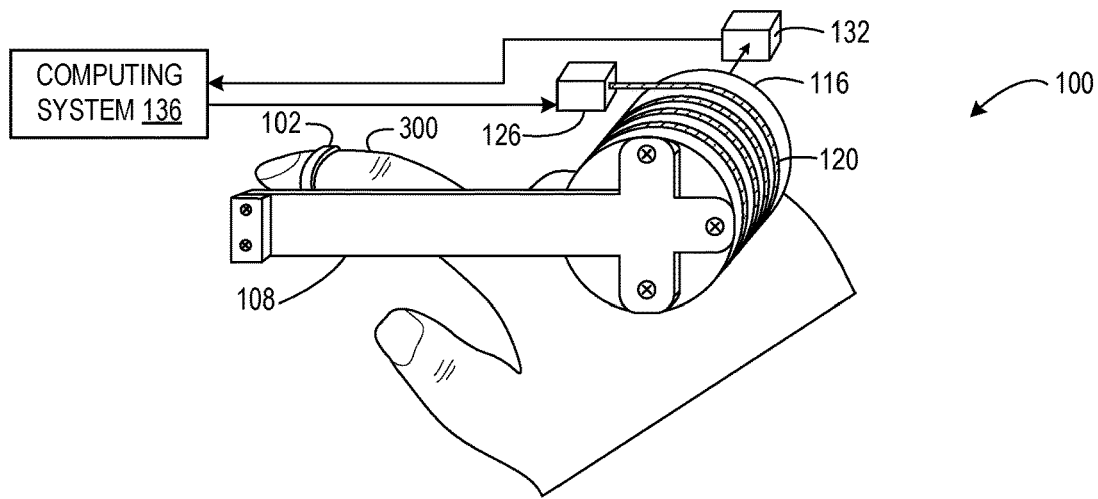
FIG. 3 schematically shows a haptic device worn by a user including a user-actuatable lever in an extended position.
Figure 4:
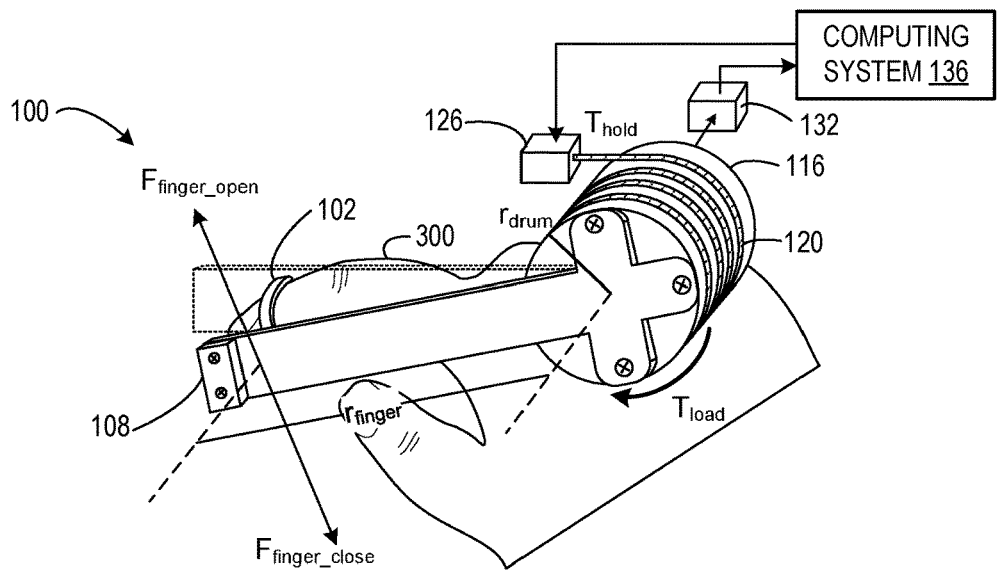
FIG. 4 schematically shows a haptic device providing a user-perceived resistance that opposes a user-actuation force applied by a user's finger to a user-actuatable lever of the haptic device.

FIGS. 3-4 schematically illustrates an example scenario where the haptic device 100 of FIG. 1 is worn on a user's hand and provides a user-perceived resistance that opposes a user-actuation force applied by the user's finger. In FIG. 3, the haptic device 100 assumes a resting position in which the user's finger 300 applies little or no user-actuation force on the finger ring 102. As such, the lever 108 assumes a fully extended or unactuated position and the drum 116 is in an unrotated state (e.g., at one end of its rotation range). Furthermore, the computing system 136 receives the rotational position of the drum 132 from the analog encoder, and sends a control signal to the actuator 126 that causes the actuator 126 to applying little or no tension to the cord 120.

In FIG. 4, the user's finger 300 applies a user actuation force ($F_{finger\_close}$) to the finger ring 102 that causes the lever 108 to actuate and correspondingly the drum 116 to rotate. The analog encoder 132 detects the change in rotational position of the drum 120 and sends the position data to the computing system 136. The computing system 136 determines a control signal based on at least the rotational position of the drum 116 and sends the control signal to the actuator 126. The actuator 126 applies a tension to the cord 120 based on the control signal. The tension applied to the cord 120 causes the cord 120 to squeeze the drum 116 and increase friction between the cord 120 and the drum 116 to brake the drum 116 and cause the lever 108 to provide a user-perceived resistance ($F_{finger\_open}$) that opposes the user-actuation force ($F_{finger\_close}$).

The equation shown in FIG. 2 is applied to this scenario to determine the user-actuation force ($F_{finger\_close}$) and the user-perceived resistance ($F_{finger\_open}$). As shown by given set of equations:

$$F_{finger\_close} = (r_{drum}/r_{finger}) * T_{load} = (r_{drum}/r_{finger}) * T_{hold} * c^{\mu\varphi}$$

$$F_{finger\_open} = (r_{drum}/r_{finger}) * T_{hold}$$

where $r_{drum}$ is the radius of the drum, $r_{finger}$ is the "radius" or length of the finger relative to the axis of rotation of the drum, $T_{load}$ is the applied cord tension, $T_{hold}$ is the minimum cord tension required to keep the cord from slipping on the drum, $\mu$ is the friction coefficient between the cord and the drum, and $\varphi$ is the total angle swept by all turns of the cord wound around the drum.

In some implementations, the haptic device may be configured to perform calibration operations to provide accurate resistance over a lifespan of the haptic device to compensate for wear or drift. In one example, the output of the analog encoder and the brake force set by the haptic device may be used to detect further closing motion. From such motion, the haptic device may be configured to infer that the effective brake resistance differs from the desired amount initially set, and the haptic device may adjust the perceived resistance to oppose the additional motion/user-actuation force. This calibration process can be further aided with use of a force sensor that provides immediate feedback about touch force in combination with the speed of the rotation of the drum/lever arm provided by the analog encoder.

In some implementations, the haptic device may be configured to perform calibration of the user-perceived resistance based on discrete braking patterns learned by the haptic device over time. For example, by using the analog encoder to track closing velocity over time, a pattern of brake engagements can be detected and braking forces can be adjusted based on the brake patterns to achieve a desired brake force.

In some implementations, the haptic device may be configured to predictively engage the resistive brake to compensate for actuator latency. For example, the closing velocity caused by bending the finger might exceed the response speed and latency of the actuator to brake in time such that haptic impressions match the user's perceptions. To mitigate this difference, the haptic device may be configured to track closing velocities and predict the closing angles at a future time. Given a known or estimated latency of the actuator to engage the brake, the haptic device may engage the brake early to actually stop the user's finger at a desired angle.

Figure 5:
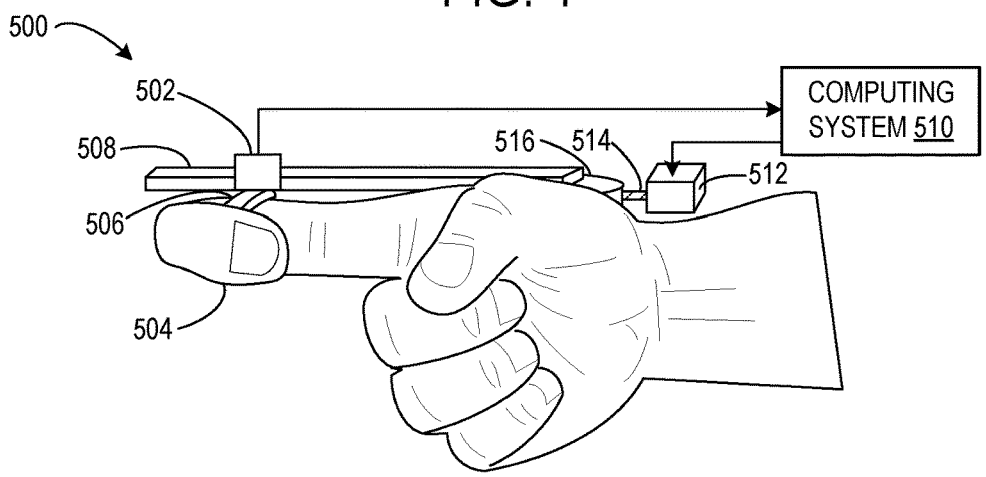
FIG. 5 schematically shows a user's finger assuming a trigger grip in a haptic device.
Figure 6:
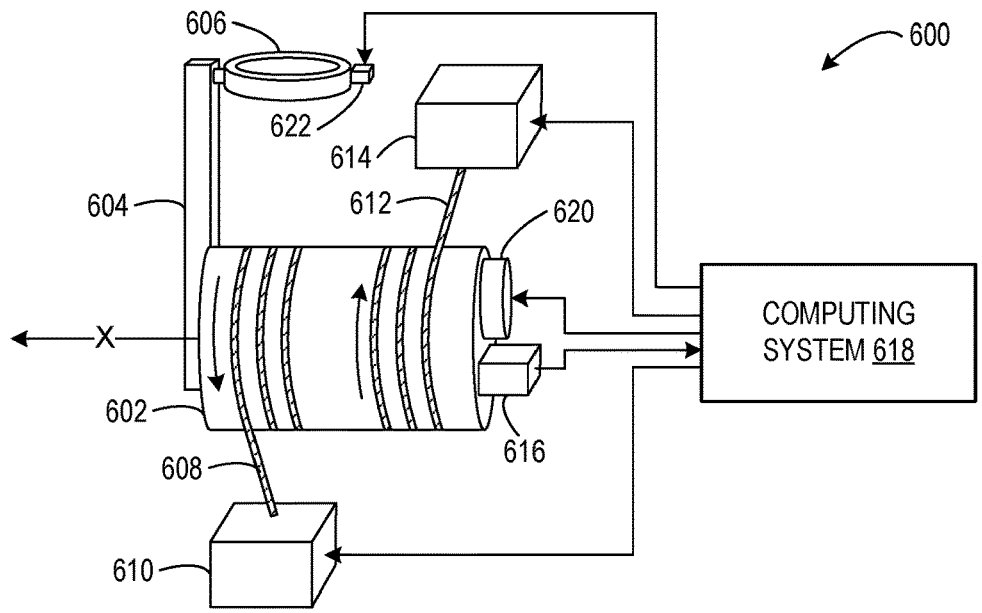
FIG. 6 schematically shows an example haptic device configured to provide bi-directional resistance.
Figure 7:
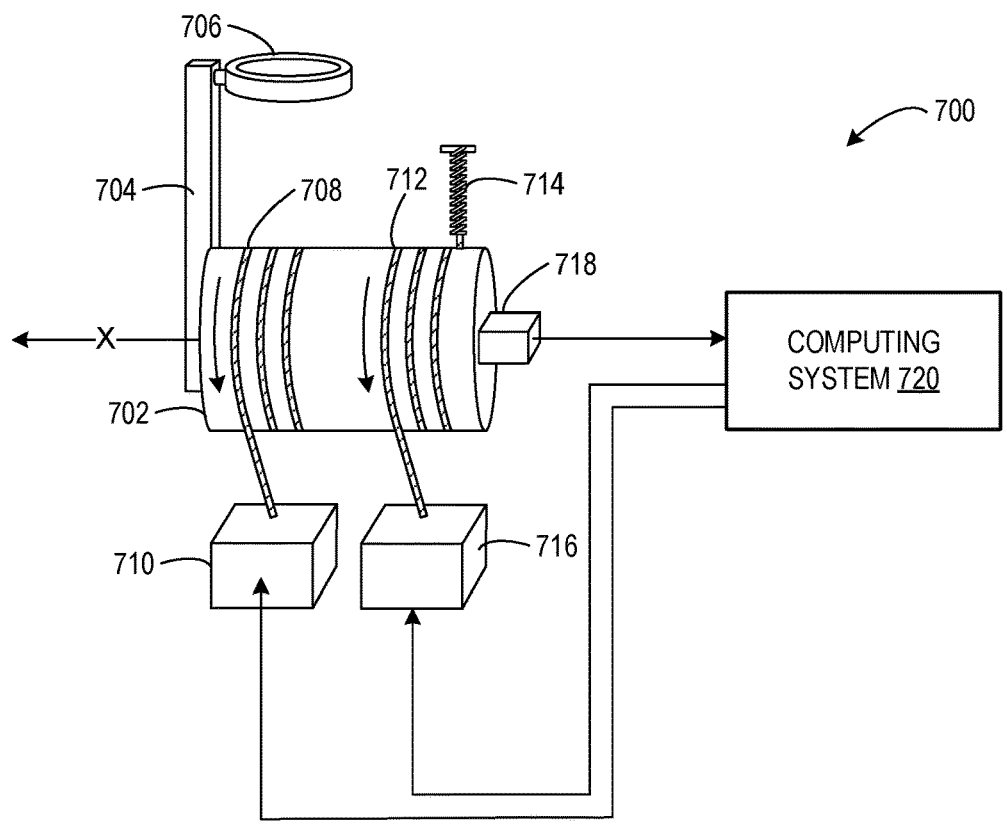
FIG. 7 schematically shows an example haptic device configured to selectively provide user-perceived resistance having energy storage characteristics via a spring.

In some implementations, the haptic device may include additional features that expand the functionality of the haptic device. Examples of different features that may be incorporated into the haptic device are shown in FIGS. 5-7. FIG. 5 schematically shows an example haptic device 500 including a trigger switch 502 configured to determine a position or orientation of the user's finger 504 on a finger ring 506. In particular, the trigger switch 502 may be configured to determine whether the user's finger 504 is substantially straight such that a pad of the user's finger 504 rests on the finger ring 506 or the user's finger 504 is crooked such that a first joint on the user's finger 504 rests on the finger ring 506 and the end of the user's finger 504 wraps around the finger ring 506. When the user's finger 504 is crooked, the user's finger may grasp the finger ring 504 in the same manner as the trigger of a gun, for example.

In some examples, the trigger switch 502 may be coupled to the finger ring 506. In other examples, the trigger switch 502 may be coupled to a lever 508 to which the finger ring 506 is rotatably coupled. In yet other examples, the trigger switch 502 may be coupled to a joint (e.g., joint 110 shown in FIG. 1) connecting the finger ring 506 to the lever 508. In some examples, the trigger switch 502 may be coupled to a bias spring (e.g., trigger bias spring 112 shown in FIG. 1) coupled between the finger ring 506 and the lever 508.

The trigger switch 502 may determine the position of the user's finger 504 on the finger ring 506 using any suitable sensor or mechanism. In one example, the trigger switch 502 takes the form of a button that is depressed based on rotation of the finger ring 506 when the user's finger assumes the trigger position. In another example, the trigger switch 502 includes an encoder that detects a change in position/rotation of the finger ring 506.

The trigger switch 502 may be configured to communicate the position of the user's finger 504 on the finger ring 506 to a computing system 510. The computing system 510 may be configured to determine a control signal based on at least the position of the user's finger 504 on the finger ring 506. The computing system may send the control signal to an actuator 512 to apply a tension to a cord 514 that further applies friction to brake a drum 516 to cause the lever 508 to provide a user-perceived resistance. For example, the computing system 508 may be configured to provide different control signals corresponding to different user-perceived resistances based on whether the user's finger is straight or crooked. As an example, when the user's finger 504 is straight, the computing system 510 may provide a control signal that corresponds to a user-perceived resistance that is constant over a rotational range of the drum 516. When the user's finger 504 is crooked, the computing system 510 may provide a control signal corresponding to a user-perceived resistance that increases linearly up to rotational position of the drum 516, at which point the user-perceived resistance decreases. Such a user-perceived resistance may simulate the hysteresis threshold of a trigger of a gun. This type of functionality may be advantageously employed to provide realistic haptic feedback in a virtual-reality or other gaming scenario, such as a shooter-style video game.

In some examples the trigger switch 502 may change the functionality of the haptic device without communicating with the computing system. For example, the trigger switch 502 may include a token detent in the trigger joint that causes the drum 516 to lock. In this scenario, the finger ring 506 may rely on just the spring force of a bias spring to provide a trigger resistance.

In some implementations, the haptic device may be configured to be bi-directional. FIG. 6 schematically shows an example haptic device 600 configured to provide bi-directional resistance. The haptic device 600 includes a drum 602 rotatable around an axis (X-axis). A lever 604 is fixed to the drum 602 such that the lever 604 actuates as the drum 602 rotates. A finger ring 606 is rotatably coupled to the lever 604. A first cord 608 is wrapped around the drum 602 in a first direction. The first cord 608 is coupled to a first actuator 610. A second cord 612 is wrapped around the drum 602 in a second direction that opposes the first direction. The second cord 612 is coupled to a second actuator 614. A position sensor 616 is configured to determine the rotational position of the drum 602. A computing system 618 is configured to receive the rotational position of the drum 602 from the position sensor 616. The computing system 618 is configured to determine a first control signal to control the first actuator 610 based on at least the rotational position of the drum 602. The first actuator 610 is configured to apply a tension to the first cord 608 that further applies friction to brake the drum 602 to cause the lever 604 to provide a user-perceived resistance that opposes a user-actuation force based on the first control signal. For example, the first control signal may vary as a function of the rotational position of the drum 602.

Furthermore, the computing system 618 is configured to determine a second control signal to control the second actuator 614 based on at least the rotational position of the drum 602. The second actuator 614 is configured to apply a tension to the second cord 612 that further applies friction to the drum 602 to provide a user-perceived resistance that opposes a user-actuation force in an opposing direction based on the second control signal. For example, the second actuator 614 may be controlled to provide the user-perceived resistance when the user's finger is moving to an extended position (e.g., the user's finger/hand is opening). In some examples, the second control signal may vary as a function of the rotational position of the drum 602.

In some implementations, both $T_{hold}$ ends of cords 608 and 612 may be connected to a single actuator instead of being connected to separate actuators. In such implementations, the computing system may control braking of the drum in opposing directions by controlling the single actuator via a control signal. For example, such an implementation may be desirable to always brake the drum in both directions.

In some examples, the computing system 618 may control the first actuator 610 and the second actuator 614 cooperatively at the same time to achieve a desired user-perceived resistance. In other examples, the computing system 618 may control the first actuator 610 and the second actuator 614 to alternately provide resistance in different directions.

In some implementations, the haptic device 600 may include a vibrotactile actuator 620 operatively coupled to the haptic device and configured to vibrate based on a control signal received from the computing system 618. In one example, the vibrotactile actuator 620 is coupled to a frame of the haptic device 602. The vibrotactile actuator 620 may provide an additional source of haptic feedback that feels different from the resistance provided by the drum and cord. For example, such vibrotactile feedback may be used to alert a user to different events in a video game or application executed on the computing system. In some implementations, the haptic device 600 may include a fingertip voice coil actuator (VCA) 622 that is coupled to the finger ring 606. The VCA 622 may be configured to vibrate based on a control signal received from the computing system 618. The vibration of the VCA 622 may be used to simulate textures on the user's finger when it is positioned in the finger ring 606 as well as supplying the higher frequencies of the force feedback experience, such as the crisp click of an actuated button. In some implementations, the VCA 622 may be coupled to a different part of the haptic device 600, such as a frame of the haptic device.

In some implementations, vibrotactile feedback may be achieved without the vibrotactile actuator. Instead, the computing system 610 may control one or both actuators 610 and 614 to operate at a very high frequency that produces a vibration or rumble sensation that is translated through the drum 602 and lever 604 to the user's finger when the drum is rotated in the force resistance direction.

In some implementations, the haptic device may be configured to selectively provide a user-perceived resistance that has energy storage characteristics provided via a spring as shown in FIG. 7. An example haptic device 700 includes a drum 702 rotatable around an axis (X-axis). A lever 704 is fixed to the drum 702 such that the lever 704 actuates as the drum 702 rotates. A finger ring 706 is rotatably coupled to the lever 704. A first cord 708 is wrapped around the drum 702 in a first direction. The first cord 708 is coupled to a first actuator 710. A second cord 712 is wrapped around the drum 602 in the same direction as the first cord 708. The second cord 712 is coupled to a spring 714 on a high-force ($T_{load}$) side of the drum 702. The second cord 712 is coupled to a second actuator 716 on a low-force ($T_{hold}$) side of the drum 702. When the lever 704 is rotated in the braking direction, the user feels the force of the spring 714 and not the stiffer brake function as the user's finger closes. Note that both the spring force and the brake force can be engaged simultaneously in order to achieve the desired effect. In this case, the actuator 716 applies a constant force on the low-tension side ($T_{hold}$) regardless of the drum rotation. Thus, the small actuator 716 on the low-tension side with the spring 714 on the high-tension side cooperatively act as a clutch that engages or disengages the spring 714.

A position sensor 718 is configured to determine the rotational position of the drum 702. A computing system 720 is configured to receive the rotational position of the drum 702 from the position sensor 718. The computing system 720 is configured to determine a first control signal to control the first actuator 710 based on at least the rotational position of the drum 702. The first actuator 710 is configured to apply a tension to the first cord 708 that further applies friction to brake the drum 702 to cause the lever 704 to provide a user-perceived resistance that opposes a user-actuation force based on the first control signal.

Furthermore, the computing system 720 is configured to control the second actuator 716 to selectively engage/disengage the spring 714. When the spring 714 is engaged, the second actuator 718 is configured to apply a constant tension to the second cord 712 and the second cord 712 further applies friction to brake the drum 702 to cause the lever 704 to provide a user-perceived resistance having energy storage characteristics due to the spring force of the spring 714.

In some examples, the computing system 720 may control the first actuator 710 and the second actuator 716 to disengage the spring 716 to provide a user-perceived resistance without energy storage characteristics, such as to simulate a firm surface. In some examples, the computing system 720 may control the first actuator 710 and the second actuator 716 to engage the spring 714 to provide a user-perceived resistance that has energy storage characteristics, such as to simulate a soft and squishy surface. In one particular example, the haptic device 700 may be controlled in this manner to simulate a spring-loaded button. In some examples, both the first and second actuators 710 and 716 may be controlled to amplify the spring force. In some examples, the computing system 720 may control the first actuator to lock the drum 702 and control the second actuator 716 to engage the spring 714 such that the user-perceived resistance is provided by the spring force of the spring 714 alone.

Figure 8:
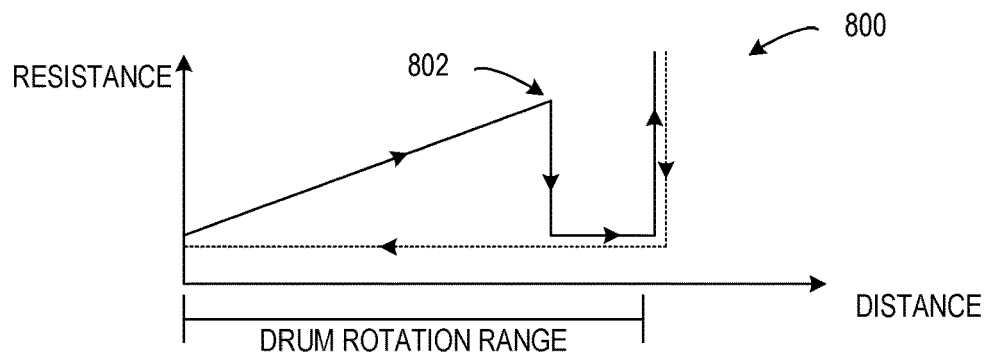
FIG. 8 shows an example user-perceived resistance profile of a haptic device.
Figure 9:
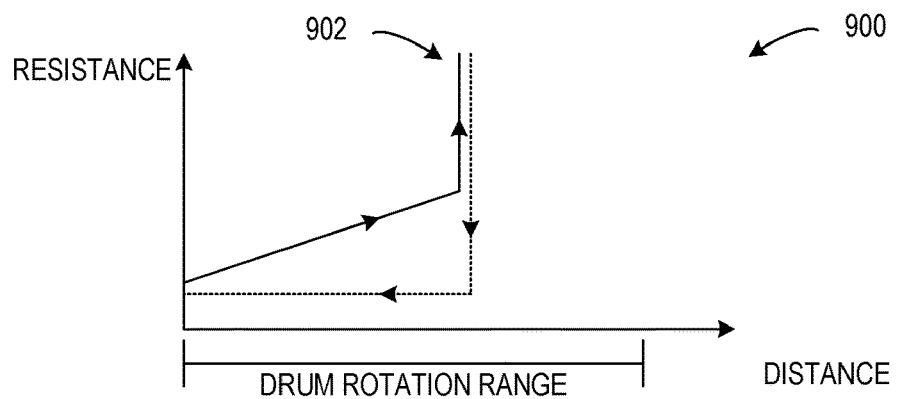
FIG. 9 shows an example user-perceived resistance profile of a haptic device including a hard stop.
Figure 10:
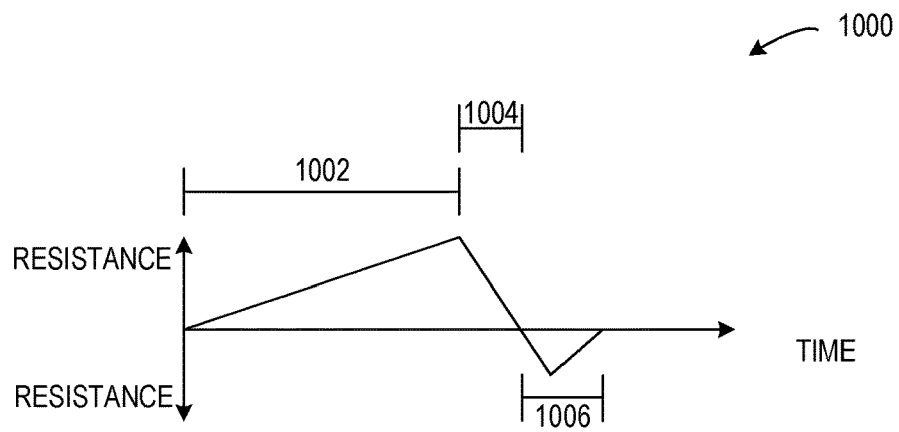
FIG. 10 shows an example user-perceived bi-directional resistance profile of a haptic device.

In some implementations, the above described haptic devices may provide a user-perceived resistance that varies as a function of a rotation range of the drum and/or user-actuatable lever according to a resistance profile. FIGS. 8-10 show different example user-perceived resistance profiles that may be enabled by the above described haptic devices. FIG. 8 shows an example user-perceived resistance profile 800 for a haptic device. The resistance profile 800 is plotted on a graph of user-perceived resistance versus distance of travel/pivot/rotation of the drum and/or user-actuatable lever. The resistance profile 800 characterizes a user-perceived resistance that is provided by the user-actuatable lever over the course of the entire rotation range of the drum. The origin of the distance axis corresponds to a fully-extended position of the user-actuatable lever. In the illustrated example, as the user-actuatable lever retracts away from the fully-extended position and toward a fully-retracted position at the other end of the rotation range, the resistance applied to the user-actuatable lever to oppose the actuation force applied by the user's finger increases linearly until a designated rotational position 802. Once the user-actuatable lever reaches the designated position 802, the resistance decreases sharply in a linear manner for the remainder of the rotation range until the user-actuatable lever reaches the fully-retracted position and encounters a hard stop. On the return path to the fully-extended position (shown offset in dashed lines for clarity), the resistance takes a different non-linear or hysteresis path.

The resistance profile 800 may be enabled by activating the actuator based on a control signal that is provided by a computing device in communication with the haptic device. The control signal may be based on at least a rotational position of the drum and/or an actuation force applied to the user-actuatable lever by the user's finger. The position of the drum may be determined by a position sensor of the haptic device and sent to the computing device.

The resistance profile 800 may simulate a variety of real-world scenarios. For example, the resistance profile can simulate touch contact with a static surface in virtual reality (assuming the user bends their finger to touch the surface) or a floating object (such as to poke it or push it away). In one example, the resistance profile 800 simulates a button or key press. In particular, the position 802 at which the resistance is greatest may correspond to a point in the button press just prior to a dome switch or scissor mechanism collapsing to allow a key to be pressed. In another example, the resistance profile 800 simulates a trigger pull of a real-world gun that may be simulated in a video game executed by the computing device. In particular, the position 802 at which the resistance is greatest may correspond to a point in the trigger pull at which a hammer drops to fire the real-world gun. In other words, the resistance profile 800 mimics the "click" of a gun.

FIG. 9 shows another example user-perceived resistance profile 900 including a hard stop for a user-actuatable lever. In this resistance profile, as the lever retracts away from a fully-extended position and toward a fully-retracted position at the other end of the rotation range, the resistance applied to the user-actuatable lever to oppose the actuation force applied by the user's finger increases linearly until a designated position 902. Once the user-actuatable lever reaches the designated position 902, the resistance increases to a resistance that prevents the user from easily pulling the user-actuatable lever any further toward the fully-retracted position. In other words, a hard stop is created at the designated position 902 that effectively shortens the rotation range of the user-actuatable lever. In one example, the actuator may apply a tension to the cord that is great enough to lock the drum at the designated position 902. On the return path to the fully-extended position (shown offset in dashed lines for clarity), the resistance takes a different non-linear or hysteresis path.

It will be appreciated that a hard stop may be created at any suitable position within the rotation range of the drum and/or user-actuatable lever in order to create any desired rotation range or trigger pull length. For example, the shorter rotation range created by the resistance profile 900 may be desirable to a user to make it easier to rapidly fire a virtual weapon in a video game.

FIG. 10 shows an example user-perceived bi-directional resistance profile 1000 for a user-actuatable lever. The bi-directional resistance profile 1000 may be employed by a haptic device capable of providing bidirectional movement. For example, the haptic device 600 shown in FIG. 6 may employ the profile 1000. The bi-directional resistance profile 1000 is plotted on a graph of user-perceived resistance provided by the user-actuatable lever versus time. During a first period 1002, user-perceived resistance provided in a first direction by the user-actuatable lever linearly. The user-perceived resistance in the first direction increases to oppose an actuation force applied to the user-actuatable lever by the user's finger. During a second period 1004, the user-perceived resistance in the first direction provided by the user-actuatable lever is reduced from a peak resistance down to zero resistance. The first and second periods 1002 and 1004 collectively form a profile similar to the resistance profile 800 of FIG. 8. During a third period 1006, the user's finger applies an actuation force to the user-actuatable lever in a second direction that opposes the first direction, and the user-actuatable lever resists the user actuation force in the second direction.

It will be appreciated that the above described profiles are provided as examples and are meant to be non-limiting. Any suitable resistance may be provided to adjust a user-perceived state of the user-actuatable lever.

In some implementations, a plurality of different resistance profiles may be predetermined. For example, a plurality of different resistance profiles may be determined based on characteristics of real-world objects that may be emulated through resistive feedback provided by the haptic device. The computing system may be configured to select one or more resistance profiles from the plurality resistance profiles to control the haptic device during specific operating conditions. In one example, the computing system may identify a virtual object with which the user is interacting, and select a resistance profile based on the identified virtual object. The computing system may repeat this operation for different virtual objects with which the user interacts over the course of a virtual experience. In other words, different resistance profiles may be used to control the haptic device during different operating conditions. In another example, the computing system may select a resistance profile based on preferences of a user. For example, a user may specify a desired trigger resistance (e.g., a pull weight) that is characterized by a particular resistance profile, and the computing system may select that resistance profile to control the haptic device when the user interacts with a virtual gun.

In some implementations, the methods and processes described herein may be tied to a computing system of one or more computing devices. In particular, such methods and processes may be implemented as a computer-application program or service, an application-programming interface (API), a library, and/or other computer-program product.

Figure 11:
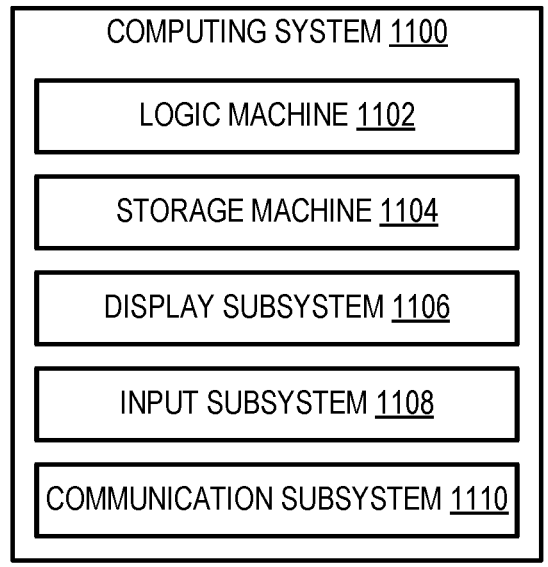
FIG. 11 show an example computing system.

FIG. 11 schematically shows a non-limiting implementation of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), virtual-reality devices, augmented-reality devices, haptic devices and/or other computing devices. For example, the computing system 1100 may be representative of computing system 136 shown in FIGS. 1, 3, and 4, computing system 510 shown in FIG. 5, computing system 618 shown in FIG. 6, and computing system 722 shown in FIG. 7.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine 1102 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1102 may include one or more processors configured to execute software instructions. Additionally or alternatively, the logic machine 1102 may include one or more hardware or firmware logic machines configured to execute hardware or firmware instructions. Processors of the logic machine 1102 may be single-core or multi-core, and the instructions executed thereon may be configured for sequential, parallel, and/or distributed processing. Individual components of the logic machine 1102 optionally may be distributed among two or more separate devices, which may be remotely located and/or configured for coordinated processing. Aspects of the logic machine 1102 may be virtualized and executed by remotely accessible, networked computing devices configured in a cloud-computing configuration.

Storage machine 1104 includes one or more physical devices configured to hold instructions executable by the logic machine 1102 to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program," and "engine" may be used to describe an aspect of computing system 1100 implemented to perform a particular function. In some cases, a program, or engine may be instantiated via logic machine 1102 executing instructions held by storage machine 1104. It will be understood that different programs, and/or engines may be instantiated from the same application, service, code block, object, library, routine, API, function, etc. Likewise, the same program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. Input subsystem 1108 may comprise or interface with one or more haptic devices, such as a game controller, air vortex machine, haptic feedback helmet, haptic feedback vest, haptic feedback shoes, and other haptic feedback clothing. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Input subsystem 1108 may comprise any suitable hardware componentry configured to establish communication with the one or more input devices. For example, input subsystem 1108 may comprise wired or wireless (e.g., Bluetooth, Wi-Fi) communication channels configured to communicate with input devices and haptic devices. Input subsystem may be an example of a communication interface.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem 1110 may be configured for communication via a wireless telephone network, or a wired or wireless local- or wide-area network. In some implementations, the communication subsystem 1110 may allow computing system 1100 to send and/or receive messages to and/or from other devices via a network such as the Internet.

In an example, a haptic device comprising a drum configured to rotate about an axis, a cord wound around the drum, a user-actuatable lever operatively coupled to the drum and configured to receive a user-actuation force, a position sensor configured to determine a rotational position of the drum, and an actuator operatively coupled to the cord and configured to apply a tension to the cord that further applies friction to brake the drum to cause the user-actuatable lever to provide a user-perceived resistance that opposes the user-actuation force, and where the user-perceived resistance varies as a function of the rotational position of the drum. In this example and/or other examples, the user-perceived resistance may be configured to change according to a resistance profile for a rotation range of the drum selected from a plurality of predetermined resistance profiles. In this example and/or other examples, the resistance profile may specify that the user-perceived resistance changes linearly over a least a portion of the rotation range of the drum. In this example and/or other examples, the resistance profile may include a hard stop at a designated position within a rotation range of the drum. In this example and/or other examples, the haptic device may further comprise a communication subsystem communicatively coupled to a computing device and configured to send the rotational position of the drum to the computing device, and receive a −feedback signal from the computing device, where the actuator is controlled based on the signal to apply the tension to the cord to provide the user-perceived resistance, and the user-perceived resistance may be determined further based at least on a parameter of the computing device. In this example and/or other examples, the user-actuation force may be a first user-actuation force applied in a first actuation direction, the cord may be a first cord wound around the drum in a first direction, the actuator may be a first actuator, the haptic device may further comprise a second cord wound around the drum in second direction that opposes the first direction, and a second actuator operatively coupled to the second cord and configured to apply a tension to the second cord that further applies friction to the drum to cause the user-actuatable lever to provide a user-perceived resistance that opposes a second user-actuation force in a second actuation direction that opposes the first actuation direction. In this example and/or other examples, the cord may be a first cord, the actuator may be a first actuator, and the haptic device may further comprise a second cord wound around the drum, a spring coupled to the second cord and configured to bias the user-actuatable lever, a second actuator operatively coupled to the second cord and configured to apply a tension to the second cord that further applies friction to brake the drum to cause the user-actuatable lever to provide a user-perceived resistance that includes a spring force of the spring and opposes the user-actuation force. In this example and/or other examples, the user-actuatable lever may include a trigger joint, and the haptic device may further comprise a finger ring operatively coupled to the trigger joint and configured to wrap around a user's finger and rotate about the trigger joint based on the user-actuation force. In this example and/or other examples, the haptic device may further comprise a trigger bias spring operatively coupled between the finger ring and the user-actuatable lever. In this example and/or other examples, the user-actuatable lever may include a trigger switch configured to determine a position of the user's finger on the finger ring, and the user-perceived resistance may be determined based on at least the position of the user's finger on the finger ring. In this example and/or other examples, the haptic device may further comprise a vibrotactile actuator operatively coupled to the haptic device and configured to vibrate based on a signal received from a computing system. In this example and/or other examples, the haptic device may further comprise a voice coil actuator operatively coupled to the haptic device and configured to vibrate to convey a virtual texture based on a signal received from a computing system.

In an example, a haptic device comprises a drum configured to rotate about an axis, a cord wound around the drum, a user-actuatable lever operatively coupled to the drum and configured to receive a user-actuation force, a position sensor configured to determine a rotational position of the drum, a communication subsystem communicatively coupled to a computing device and configured to send the rotational position of the drum to the computing device, and receive, from the computing device, a signal that varies as a function of the rotational position of the drum, and an actuator operatively coupled to the cord and configured to apply a tension to the cord that further applies friction to brake the drum to cause the user-actuatable lever to provide a user-perceived resistance that opposes the user-actuation force based on the signal. In this example and/or other examples, the user-perceived resistance may be configured to change according to a resistance profile for a rotation range of the drum selected from a plurality of predetermined resistance profiles. In this example and/or other examples, the user-perceived resistance may include a hard stop at a designated position within a rotation range of the drum. In this example and/or other examples, the user-perceived resistance may be determined further based at least on a parameter of the computing device. In this example and/or other examples, the user-actuation force may be a first user-actuation force applied in a first actuation direction, the cord may be a first cord wound around the drum in a first direction, the actuator may be a first actuator, the signal may be a first signal, and the haptic device may further comprise a second cord wound around the drum in second direction that opposes the first direction, and a second actuator operatively coupled to the second cord and configured to apply a tension to the second cord that further applies friction to the drum to cause the user-actuatable lever to provide a user-perceived resistance that opposes a second user-actuation force in a second actuation direction that opposes the first actuation direction based on a second signal. In this example and/or other examples, the cord may be a first cord, the actuator may be a first actuator, and the haptic device may further comprise a second cord wound around the drum, a spring coupled to the second cord and configured to bias the user-actuatable lever, a second actuator operatively coupled to the second cord and configured to apply a tension to the second cord that further applies friction to brake the drum to cause the user-actuatable lever to provide a user-perceived resistance that includes a spring force of the spring and opposes the user-actuation force. In this example and/or other examples, the haptic device may further comprise a voice coil actuator operatively coupled to the haptic device and configured to vibrate to convey a virtual texture based on a signal received from a computing system.

In an example, a haptic device comprises a drum configured to rotate about an axis, a first cord wound around the drum in a first direction, a second cord wound around the drum in the first direction, a spring operatively coupled to the second cord, a user-actuatable lever operatively coupled to the drum and configured to receive a user-actuation force, a position sensor configured to determine a rotational position of the drum, a communication subsystem communicatively coupled to a computing device and configured to send the rotational position of the drum to the computing device, receive, from the computing device, a first signal that varies as a function of the rotational position of the drum, and receive, from the computing system, a second signal, a first actuator operatively coupled to the first cord and configured to apply a tension to the cord that further applies friction to brake the drum to cause the user-actuatable lever to provide a first user-perceived resistance that opposes the user-actuation force based on the first signal, and a second actuator operatively coupled to the second cord and configured to apply a tension to the second cord that further applies friction to the drum to cause the user-actuatable lever to provide a second user-perceived resistance that includes a spring force of the spring and opposes the user-actuation force based on the second signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A haptic device comprising:
 a drum configured to rotate about an axis;
 a cord wound around the drum;
 a user-actuatable lever operatively coupled to the drum and configured to receive a user-actuation force;
 a position sensor configured to determine a rotational position of the drum; and
 an actuator operatively coupled to the cord and configured to apply a tension to the cord that further applies friction to brake the drum to cause the user-actuatable lever to provide a user-perceived resistance that opposes the user-actuation force, where the user-perceived resistance varies as a function of the rotational position of the drum and where the cord slips on the drum when the tension is less than a threshold and does not slip on the drum when the tension is greater than the threshold.

2. The haptic device of claim 1, where the user-perceived resistance is configured to change according to a resistance profile for a rotation range of the drum selected from a plurality of predetermined resistance profiles.

3. The haptic device of claim 2, where the resistance profile specifies that the user-perceived resistance changes linearly over a least a portion of the rotation range of the drum.

4. The haptic device of claim 2, where the resistance profile includes a hard stop at a designated position within a rotation range of the drum.

5. The haptic device of claim 1, further comprising:
 a communication subsystem communicatively coupled to a computing device and configured to:
  send the rotational position of the drum to the computing device, and
  receive a –feedback signal from the computing device, where the actuator is controlled based on the signal to apply the tension to the cord to provide the user-perceived resistance, and where the user-perceived resistance is determined further based at least on a parameter of the computing device.

6. The haptic device of claim 1, where the user-actuation force is a first user-actuation force applied in a first actuation direction, where the cord is a first cord wound around the drum in a first direction, where the haptic device further comprises:
 a second cord wound around the drum in a second direction that opposes the first direction, where a tension is applied to the second cord that further applies friction to the drum to cause the user-actuatable lever to provide a user-perceived resistance that opposes a second user-actuation force in a second actuation direction that opposes the first actuation direction.

7. The haptic device of claim 1, where the cord is a first cord, where the actuator is a first actuator, and where the haptic device further comprises:
 a second cord wound around the drum;
 a spring coupled to the second cord and configured to bias the user-actuatable lever;
 a second actuator operatively coupled to the second cord and configured to apply a tension to the second cord that further applies friction to brake the drum to cause the user-actuatable lever to provide a user-perceived resistance that includes a spring force of the spring and opposes the user-actuation force.

8. The haptic device of claim 1, where the user-actuatable lever includes a trigger joint, and where the haptic device further comprises:
 a finger ring operatively coupled to the trigger joint and configured to wrap around a user's finger and rotate about the trigger joint based on the user-actuation force.

9. The haptic device of claim 8, further comprising:
a trigger bias spring operatively coupled between the finger ring and the user-actuatable lever.

10. The haptic device of claim 8, where the user-actuatable lever includes a trigger switch configured to determine a position of the user's finger on the finger ring, and where the user-perceived resistance is determined based on at least the position of the user's finger on the finger ring.

11. The haptic device of claim 1, further comprising:
a vibrotactile actuator operatively coupled to the haptic device and configured to vibrate based on a signal received from a computing system.

12. The haptic device of claim 1, further comprising:
a voice coil actuator operatively coupled to the haptic device and configured to vibrate to convey a virtual texture based on a signal received from a computing system.

13. A haptic device comprising:
a drum configured to rotate about an axis;
a cord wound around the drum;
a user-actuatable lever operatively coupled to the drum and configured to receive a user-actuation force;
a position sensor configured to determine a rotational position of the drum;
a communication subsystem communicatively coupled to a computing device and configured to:
  send the rotational position of the drum to the computing device, and
  receive, from the computing device, a signal that varies as a function of the rotational position of the drum; and
an actuator operatively coupled to the cord and configured to apply a tension to the cord that further applies friction to brake the drum to cause the user-actuatable lever to provide a user-perceived resistance that opposes the user-actuation force based on the signal, and where the cord slips on the drum when the tension is less than a threshold and does not slip on the drum when the tension is greater than the threshold.

14. The haptic device of claim 13, where the user-perceived resistance is configured to change according to a resistance profile for a rotation range of the drum selected from a plurality of predetermined resistance profiles.

15. The haptic device of claim 14, where the user-perceived resistance includes a hard stop at a designated position within a rotation range of the drum.

16. The haptic device of claim 13, where the user-perceived resistance is determined further based at least on a parameter of the computing device.

17. The haptic device of claim 13, where the user-actuation force is a first user-actuation force applied in a first actuation direction, where the cord is a first cord wound around the drum in a first direction, and where the haptic device further comprises:
a second cord wound around the drum in a second direction that opposes the first direction, and where a tension is applied to the second cord that further applies friction to the drum to cause the user-actuatable lever to provide a user-perceived resistance that opposes a second user-actuation force in a second actuation direction that opposes the first actuation direction.

18. The haptic device of claim 13, where the cord is a first cord, where the actuator is a first actuator, and where the haptic device further comprises:
a second cord wound around the drum;
a spring coupled to the second cord and configured to bias the user-actuatable lever;
a second actuator operatively coupled to the second cord and configured to apply a tension to the second cord that further applies friction to brake the drum to cause the user-actuatable lever to provide a user-perceived resistance that includes a spring force of the spring and opposes the user-actuation force.

19. The haptic device of claim 13, further comprising:
a voice coil actuator operatively coupled to the haptic device and configured to vibrate to convey a virtual texture based on a signal received from a computing system.

20. A haptic device comprising:
a drum configured to rotate about an axis;
a first cord wound around the drum in a first direction;
a second cord wound around the drum in the first direction;
a spring operatively coupled to the second cord;
a user-actuatable lever operatively coupled to the drum and configured to receive a user-actuation force;
a position sensor configured to determine a rotational position of the drum;
a communication subsystem communicatively coupled to a computing device and configured to:
  send the rotational position of the drum to the computing device,
  receive, from the computing device, a first signal that varies as a function of the rotational position of the drum, and
  receive, from the computing system, a second signal;
a first actuator operatively coupled to the first cord and configured to apply a tension to the cord that further applies friction to brake the drum to cause the user-actuatable lever to provide a first user-perceived resistance that opposes the user-actuation force based on the first signal; and
a second actuator operatively coupled to the second cord and configured to apply a tension to the second cord that further applies friction to the drum to cause the user-actuatable lever to provide a second user-perceived resistance that includes a spring force of the spring and opposes the user-actuation force based on the second signal.

* * * * *